Feb. 4, 1936. H. L. RANKIN 2,029,672
OIL LEVEL GAUGE
Filed May 17, 1934
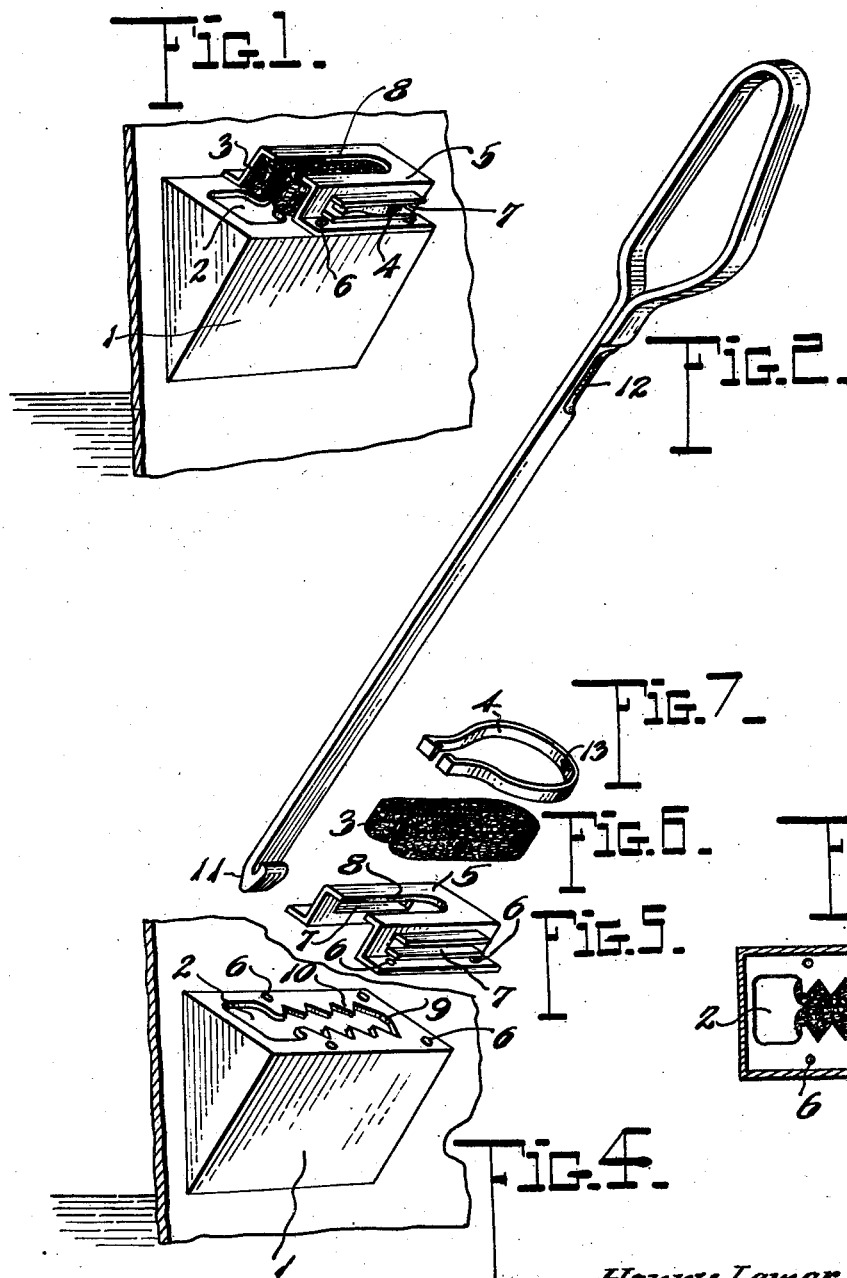
Inventor
Henry Lamar Rankin
By Robert Robb
Attorneys Patented Feb. 4, 1936

2,029,672

UNITED STATES PATENT OFFICE 2,029,672

OIL LEVEL GAUGE

Henry Lamar Rankin, Tampa, Fla.

Application May 17, 1934, Serial No. 726,091

10 Claims. (Cl. 73—120)

My invention relates to improvements in oil-level gauges in which the oil-level is determined by withdrawing a gauge rod from a crankcase through an opening, adapted to the purpose, for inspection; and the objects of my invention are, first, to provide a means by which a gauge rod may be cleaned as it is being withdrawn from a supplementary portion of an enlarged and re-designed opening into the crankcase; second, to afford a way for the oil wiped off the rod to return to the crankcase; third, to arrange a way in which the supplementary opening into the crankcase shall remain closed except when occupied by the gauge rod in being cleaned; fourth, to provide a means whereby the gauge rod may be cleaned of oil by a simple motion, without being entirely withdrawn from the crankcase, may be reinserted into the oil in the crankcase without hunting for the hole, and withdrawn again in the ordinary way for the inspection of the oil level as shown on the rod.

I attain these objects by mechanism illustrated in the accompanying drawing in which—

Figure 1 is a view in perspective of a crankcase with an opening therein and a cooperating wiper device, the gauge rod being removed; Figure 2 is a detail view of the gauge rod; Figure 3 is a plan view of the crankcase opening with wiper attached viewed from beneath; Figure 4, a view in perspective of the crankcase opening after the removal of the wiper device; Figure 5 is a perspective view of the wiper case; Figure 6 is a perspective view of the folded strip of felt, used in this instance as the wiping material; and Figure 7 is a detail view of the spring for holding the felt in the case.

Similar numerals refer to similar parts throughout the several views.

The crankcase extension 1, contains the opening 2 and the wiper device consisting of the strip of felt 3 (Fig. 6) and the spring 4 (Fig. 7) contained in the case 5 (Fig. 5), screwed to it by means of screws through the screw holes 6. The wiper case 5 contains an opening at each side 7 through which the spring 4 (Fig. 7) acts to compress the folded slab of felt 3 (Fig. 6), and a slot 8, through which the gauge rod Figure 2 may be moved when being wiped.

As shown in Figure 4, the crankcase opening consists of the main portion 2, in which the rod is normally seated, and a supplementary opening 9 forming a lateral extension, with serrated edges 10, so designed as to act as a stop to the abutment head 11, of the gauge rod 2a when said rod is withdrawn outwardly through supplementary opening 9.

Gauge rod 2a may be withdrawn altogether through conventional opening 2. Introduction of the gauge rod between the wiping elements 3 (Fig. 6) is facilitated by shaping one portion of the strip of metal of which it consists to an edge, as shown at 12.

The spring Figure 7, is attached to the wiper case Figure 5, by a rivet or screw through hole 13.

It is clear that the device I have described particularly is only one of several ways in which the objects of my invention may be attained. The enlargement of the lower end of the gauge rod may be formed by shaping in a forge or may consist of added metal. The opening into the crankcase may be of the general shape of a keyhole of which the circular portion of the aperture, corresponding to the conventional opening into the crankcase in an oil-level gauge, may be approximately round, or oblong, or square; and the slot extending therefrom, corresponding to the supplementary opening, may be of any dimension in its length larger than the width of the gauge rod, and of any dimension in its width which is at once larger than the thickness of the gauge rod, except at its lower end, and smaller than the dimension of this lower end. The wiper may be simply a folded strip of some compressible material suitably held over the supplementary portion of the opening into the crankcase, or it may consist of two opposing resilient capsules contained in a case and held in contact by a suitable means, or it may consist of two opposing, cooperating fingers of metal, or of other substances such as leather or cork, yieldably and firmly held together by a suitable means. The device may be located at the crankcase wall, within the crankcase, outside the crankcase wall, or even on a case or an extension added to, or joined to and opening into the crankcase.

I am aware that prior to my invention oil-level gauges consisting of a gauge rod and an opening into a crank case are in general use. I therefore do not claim such a combination broadly; but specifically my invention resides essentially in the combination with such construction of a wiping device which by virtue of its location and arrangement necessitates only the lateral shifting of the rod into the portion of the crankcase opening covered by the wiper to enable said rod to be moved and wiped. This insures the drainage of the oil back into the crank case, eliminates removal and wiping thereafter, prevents dripping of oil on the vehicle parts, and greatly facilitates the gauging operation.

I claim:

1. In a device of the class described, the combination of a liquid container having an opening therein into one side of which a gauge rod may be freely inserted to measure the content of said container, and a wiper device coacting with the other side of said opening in such a manner that the said rod may be shifted from the first mentioned side to the wiper side into coaction with said wiper device when it is desired to wipe the rod while the latter remains in the opening aforesaid.

2. In a device of the class described, the combination of an oil container having an opening therein formed to normally receive a gauge rod when measuring the oil content of said container, and a wiper element disposed at one side of said opening and having its entrance facing the rod when in said opening whereby said rod may be shifted into the wiper device without removal from the opening and the oil wiped off into the container.

3. In a device of the class described, the combination of a liquid container having an opening therein formed with a rod receiving portion into and out of which the rod is freely movable for measuring purposes, said opening having a lateral extension into which the rod may be shifted by sidewise movement for wiping purposes, and a wiping element engaging about the lateral extension to receive and wipe the rod as the same is moved into and out of said lateral extension.

4. In a device of the class described, the combination of a liquid container having an opening therein formed with a rod receiving portion into and out of which the rod is freely movable for measuring purposes, said opening having a lateral extension into which the rod may be shifted by sidewise movement for wiping purposes, a wiping element engaging about the lateral extension upon which to wipe the rod by movement outwardly of the opening extension, and abutment means formed on the edge of the extension for limiting the outward movement of the rod.

5. In a device of the class described, the combination of a liquid container having an opening therein to receive a gauge rod, a wiper device including a holder secured to the container over a portion of said opening, and a wiper element in said holder, the entrance to said device being arranged to admit the rod upon sidewise movement thereof while it is in the opening, whereby the rod may be wiped when it is moved in and out of the said opening.

6. In a device of the class described, the combination with a crankcase having an opening therein and a gauge rod disposed in said opening so as to be freely movable in and out the opening for measuring the oil content of the crankcase, of a wiper device mounted over a portion of the opening and having its entrance thereinto arranged at the side of the rod, said rod being shiftable laterally into the wiper device while still in the opening and movable when therein inwardly and outwardly of the crankcase to effect removal of the oil adhering to the rod and drainage of said removed oil back into the crankcase.

7. A device as set forth in claim 6, in which the wiper device is composed of a holder attached to the crankcase, and yieldable wipers between which the rod is adapted to be passed.

8. A device as set forth in claim 6, combined with means for preventing full withdrawal of the rod while disposed in its wiping position.

9. A device as set forth in claim 6, in which the wiper device is composed of a holder attached to the crankcase, a strip of felt bent back upon itself, and a clip engaging the holder and felt for yieldably retaining the felt in the holder.

10. A device as set forth in claim 6, in which the rod is provided with a stop at one end arranged to coact with the edge of the opening adjacent the wiper for limiting outward movement of the rod and in which the rod is formed with an entering edge for facilitating its entrance into the wiper device.

HENRY LAMAR RANKIN.